United States Patent [19]

O'Connor et al.

[11] Patent Number: 5,648,767

[45] Date of Patent: Jul. 15, 1997

[54] TRANSPONDER DETECTION SYSTEM AND METHOD

[75] Inventors: Roger J. O'Connor, Dove Canyon; Robert C. Knittle, Fullerton, both of Calif.

[73] Assignee: Hughes Aircraft, Los Angeles, Calif.

[21] Appl. No.: 346,730

[22] Filed: Nov. 30, 1994

[51] Int. Cl.$^6$ ................................................ G08G 1/00
[52] U.S. Cl. .................. 340/928; 340/933; 235/384; 342/42; 342/44; 342/51; 342/373
[58] Field of Search ............................ 340/928, 932.2, 340/933, 991, 825.54, 825.34; 235/384, 380, 379; 342/51, 417, 424, 422, 423, 432, 434, 442, 147, 445, 437, 450, 456, 457, 465, 373, 42, 44

[56] References Cited

U.S. PATENT DOCUMENTS

| | | | |
|---|---|---|---|
| 3,568,197 | 3/1971 | Cubley | 342/424 |
| 3,728,730 | 4/1973 | Takao et al. | 342/442 |
| 3,924,236 | 12/1975 | Earp et al. | 342/147 |
| 4,103,304 | 7/1978 | Burnham et al. | 342/422 |
| 5,227,803 | 7/1993 | O'Connor et al. | 342/442 |
| 5,307,349 | 4/1994 | Shloss et al. | 340/825.54 |
| 5,425,032 | 6/1995 | Shloss et al. | 340/825.54 |

*Primary Examiner*—Jeffery Horsass
*Assistant Examiner*—Nina Tong
*Attorney, Agent, or Firm*—G. S. Grunebach; M. W. Sales; W. K. Denson-Low

[57] ABSTRACT

A transponder detection system for detecting the presence at a detection area of a vehicle on which the transponder is mounted. Two antenna arrays are located on opposite sides of the detection area, and have their boresights directed to the detection area. For each array, a sum and difference signal of signals received from the transponder are measured. The sum channel signal is used to establish whether a transmission has occurred, and the difference channel signal is used to isolate any transponder that is at the detection area.

21 Claims, 6 Drawing Sheets

TRANSPONDER DETECTION SYSTEM AND METHOD

TECHNICAL FIELD OF THE INVENTION

The invention relates to transponder supported operations such as vehicle mounted transponder systems, and more particularly to a transponder detection system which measures the phase front of a signal transmitted from the transponder and uses this information to determine if the vehicle is located in a certain area.

BACKGROUND OF THE INVENTION

In barrier-based toll collection systems and other types of transponder supported operations, the separation of transponder and non-transponder equipped vehicles is a key system design feature. Conventionally, this process is accomplished by the use of the antenna pattern of the transponder/reader communication system. The antenna is focused on the decision area and if communications occur in this antenna pattern area, then the vehicle is declared to have a transponder and electronic processing is utilized. The problem with this approach is that the antenna pattern must be small enough to avoid communicating with vehicle transponders adjacent to the decision area and associating that communications with a non-transponder equipped vehicle in the decision area. These adjacent transponders can be behind the vehicle in the decision area, i.e., "bumper to bumper reads" or can be in an adjacent lane, i.e., "cross lane reads."

Another problem occurs when multiple vehicles, each with transponders, arrive in a sequence at the barrier. If the system communicates with the vehicles in a different order from the order in which they physically arrived, an error will be made since they will be processed in the "electronic order" not the physical order. This error, i.e., an "out of sequence read," associates the wrong vehicle with a transmission and can result in a vehicle being processed incorrectly.

Conventional systems have attempted to solve these problems in four basic ways. First, the communications area of the antenna is made as small as possible while trying to maintain reliable processing. Second, the data processed is kept to a minimum or vehicle speed is limited so that the amount of time that the vehicle is in the communication zone allows for multiple communications tries, thus improving the performance. Third, the design of the barrier and mounting of the antenna attempts to minimize and control multipath effects so that the communication zone has a minimum number of potential fades. Fourth, the transponder is mounted in the vehicle so that all vehicles have the same antenna pattern and communication coverage. In the extreme, this means that the transponders are "trimmed in power" to achieve consistent communication coverage.

Different techniques have been employed to accomplish these error reduction functions. In one approach, a directive antenna illuminates a small area of road and limits the communication zone area by using a backscatter communication technique. This provides a path loss attenuation that increases at a rate of $R^4$ and, thus improves coverage control. In addition, the transponder is in a specific place in the vehicle and a vehicle detector activates the communication process. This technique makes transponder location critical and the transponder antenna pattern variation from vehicle to vehicle causes many processing errors. The use of the vehicle detector to activate the process minimizes processing errors but decreases collection performance since the probability of vehicle detection is then multiplied times the communication processing probability. Specified performance values of greater than 99.995% probability of correct processing makes this approach unattractive.

In another approach, antennas buried in the road are used for communication with the transponder equipped vehicles. The transponders are then mounted on the bumper of the vehicle thus controlling the communication zone used to perform the processing. The road antennas are expensive to install and failure requires penetration of the road surface for repair, therefore shutting down of the traffic lane. In addition, the mounting of the transponder on the bumper requires a much more rugged housing and makes difficult any vehicle operator interface with the system processing results.

SUMMARY OF THE INVENTION

In accordance with one aspect of the invention, a transponder detection system for detecting the presence of a transponder-equipped vehicle at a detection zone is described. The transponder detection system includes first and second antenna arrays, each array comprising a plurality of antenna elements defining an array boresight. The antenna arrays are disposed at spaced locations relative to the detection area, with each array boresight directed at the detection zone from different orientations. The system further includes receiver means responsive to transponder transmissions received from the equipped vehicle for providing, for each array, a sum signal representing the sum of signal contributions from each element comprising the array and a difference signal representing a difference between signal contributions from each element comprising the array. Processing means responsive to the respective array sum and difference signals determines whether a transponder-equipped vehicle is located within the detection zone. The processing means comprises means responsive to the sum signals to determine whether a valid transponder signal has been received by the system, and means responsive to said difference signals to determine whether said transponder-equipped vehicle is located within the detection zone.

The invention can also be used with a single antenna array, in applications such as single lane road systems.

In accordance with another aspect of the invention, this transponder detection system is used in a barrier-based toll collection system for determining vehicle tolls for access to a toll roadway. The collection system includes a toll collection barrier area defining the vehicle detection zone, a vehicle detector for detecting the presence of a vehicle at the detection zone, and a toll ticket dispenser for dispensing toll tickets to vehicles entering the detection zone. The transponder detection system detects the presence of a transponder-equipped vehicle at the detection zone. Means responsive to the detection system processor determination that a detected vehicle at a detection zone is transponder-equipped for suppressing the operation of the ticket dispenser and for electronically issuing a toll charge to the transponder-equipped vehicle. Each transponder-equipped vehicle is assigned a unique code, wherein the transponder for an equipped vehicle transmits an RF signal encoded with the unique code, and the transponder-equipped detection system recovers the code from received transmissions to assign the electronic charge to the vehicle assigned the unique code.

Other transponder supported vehicle and container supported processing systems that require the correlation of a transponder electronic identification with the physical object can utilize other embodiments of the invention.

BRIEF DESCRIPTION OF THE DRAWING

These and other features and advantages of the present invention will become more apparent from the following detailed description of an exemplary embodiment thereof, as illustrated in the accompanying drawings, in which.

DETAILED DESCRIPTION OF THE PREFERRED EMBODIMENT

The transponder detector system of this invention measures the phase difference between multiple antenna elements of a signal transmitted from a vehicle mounted transponder. A signal that arrives at the antenna elements at the identical time will have the same electrical phase. This is called a phase front of the signal. When a signal arrives at antenna elements at different times, each element receives a different signal phase. The differences between these phases is used to determine the direction of signal arrival. The direction information from two or more antennas is used to determine if the transponder is located in a certain area. This data is then used to activate a system to process the vehicle electronically rather than manually.

Figure 1:
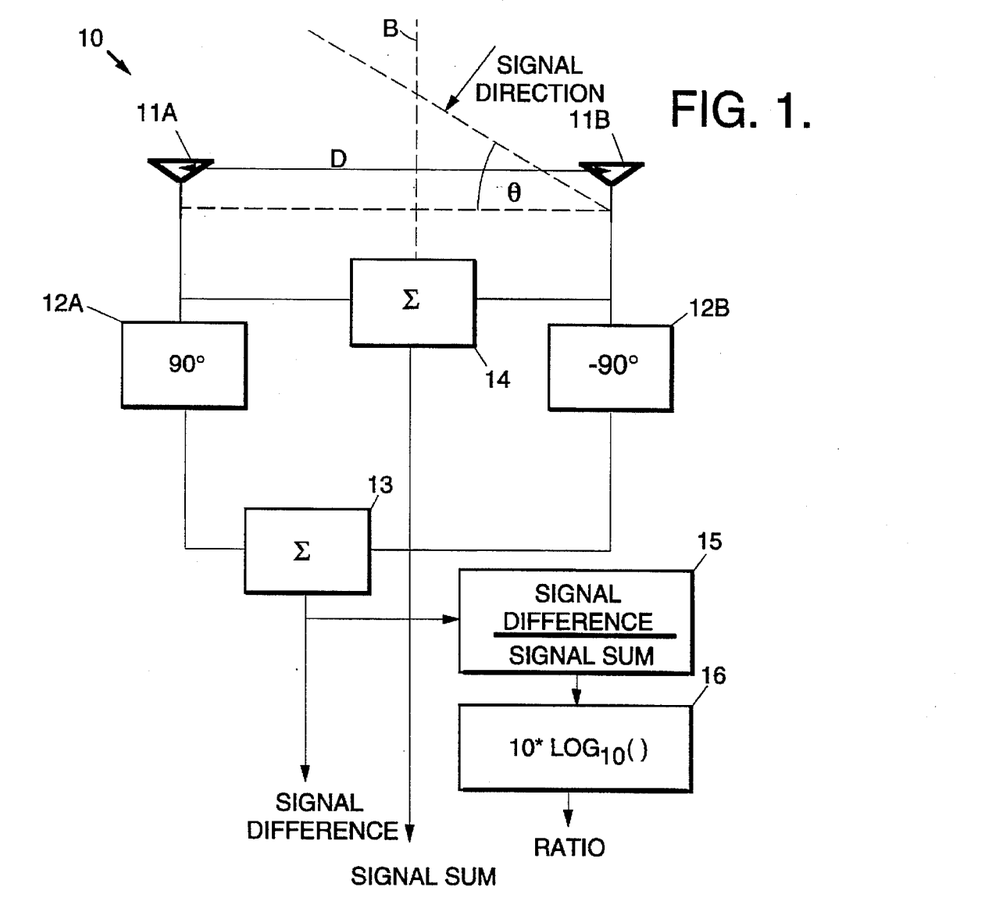
FIG. 1 is a simplified block diagram of a system employing signal angle of arrival processing in accordance with the invention.

FIG. 1 illustrates in simplified form an exemplary system 10 illustrating aspects of the invention. The invention uses a phase mono-pulse technique to detect transponders that are on the "boresight" of the antenna array. The array "boresight" is directed at the area of interest on the road. A sum and then a difference measurement of the received signal from the antenna is used in the detection process. When a transponder approaches the area of the road at which communication with the electronic toll system occurs (called the communication zone) the signals transmitted from the transponder are intercepted by the invention's phase measurement antennas. In the invention, two of these antennas are used and each antenna has two or more elements. FIG. 1 shows only one antenna comprising elements 11A and 11B. In the simplest implementation, the spacing D between the elements 11A and 11B is $\lambda/2$ or 180° of phase shift. Therefore, the relative electrical phase ($\Phi$) of the signals at the elements defines the direction or the "Angle of Arrival." This is defined by the following equation.

$$\Phi = D\ Sin(\Theta) = \lambda/2\ Sin(\Theta)$$

$$\Phi 180°\ Sin(\Theta),$$

where D is the distance between the elements, and $\Theta$ is the spatial angle measured from a line connecting the two elements and a line parallel to the direction of travel of the wave front.

A line perpendicular to the direction of travel of the wave front would pass through the transponder location. When this line is perpendicular to the line between the antennas this is called the boresight B of the antenna. From the equation it can be seen that when the transponder is located on the boresight, the spatial angle of arrival, is 0° and the electrical phase difference between the elements is 0°. If the spatial angle is 90°, the electrical phase difference is 180°, and if the spatial angle is −90°, then the electrical phase difference is −180°. Therefore, there is a one-to-one correspondence between the electrical phase difference and the spatial angle when the antenna element spacing is $\lambda/2$. The locus of all points in space that produce the same electrical phase difference between the elements form cones in space whose apexes are at the center of the line connecting the two antenna elements.

If the antenna elements 11A and 11B are spaced further apart than $\lambda/2$, then the locus defines a family of cones for each electrical phase difference. When the transponder signal is on antenna boresight the cone is actually a plane. When this plane intersects the road surface it forms a straight line.

As noted, when a signal arrives from a direction perpendicular to the plane containing the elements the electrical phase shift is 0°. Therefore, the electrical phase at both elements is the same. This boresight direction is used by the invention signal processing. In the invention the signal at the one of the elements (11A) is phase shifted +90° by phase shifter 12A and the other element 11B is phase shifted −90° by phase shifter 12B. The phase shifted signals from the two elements are then added together at summer 13 to form a difference ($\Delta$) signal. When the signal comes from the direction of the boresight, then the difference signal is (zero) (VCos($\omega$t+90°)+VCos($\omega$t−90°)). The signals from the two antenna elements 11A and 11B are also added together without the phase shifting by summer 14 to form a sum signal. When the signal arrives from the direction of the boresight, the sum signal is 2VCos($\omega$t). The ratio of the difference signal to the sum signal is obtained at ratio block 15, and the logarithm is taken at log block 16 to provide the logarithmic ratio, in accordance with the invention.

Figure 2:
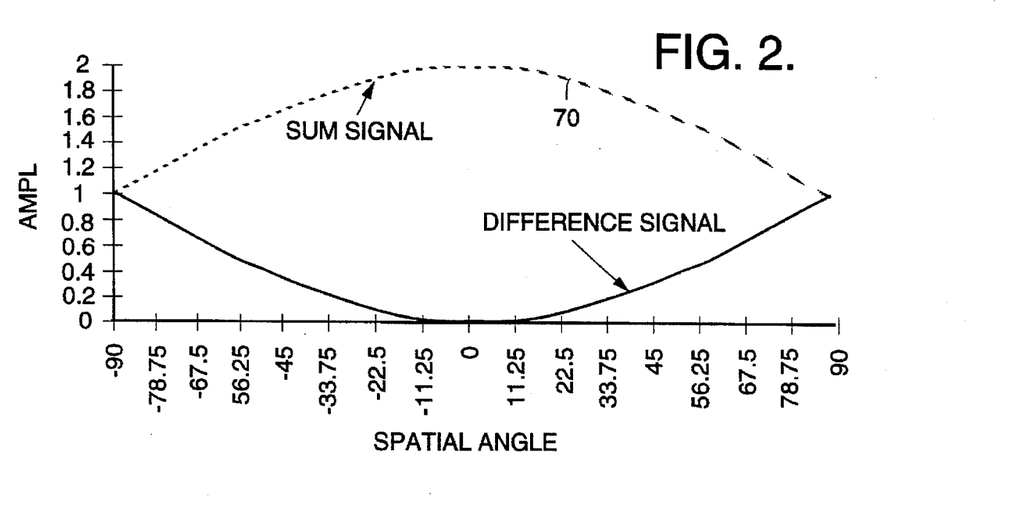
FIG. 2 plots the magnitudes of sum and difference signals resulting from processing in accordance with the invention as a function of spatial angle.

FIG. 2 is a plot of the values of the respective sum and difference signals obtained from the arrangement of FIG. 1 for a range of spatial angles from −90° to 90°.

Figure 3:
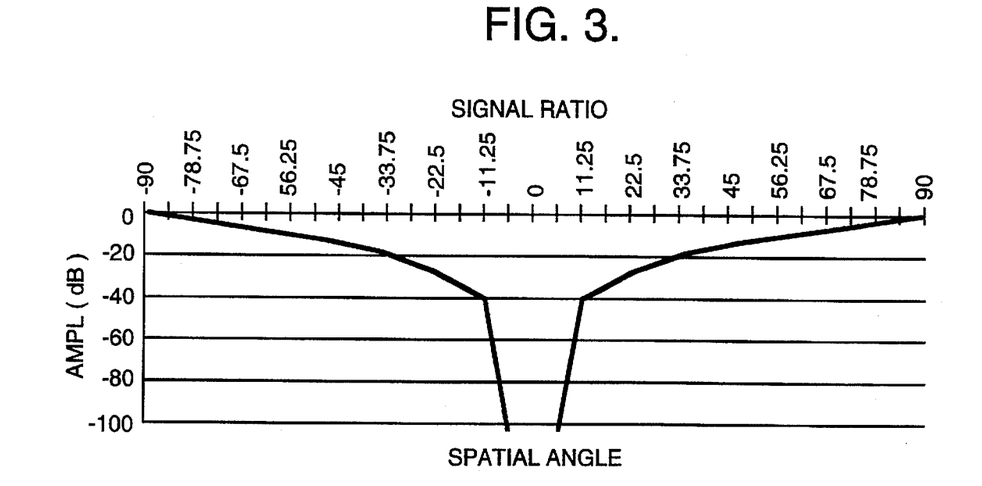
FIG. 3 is a plot of the amplitude in dB of the logarithmic ratio of the difference and sum signals of FIG. 1.

FIG. 3 is a plot of amplitude (dB) of the ratio of the sum and difference signals, i.e., $+20*Log_{10}$ of the ratio of the sum and the difference signals. The results of this plot are used by the invention to determine when a transponder is in the communication zone and when it is on the boresight of the antenna. Recall that when the transponder is on the boresight, the plane of the transponder intersects the plane parallel to the road surface containing the transponder and this line defines the locus of points that can contain the transponder. Two antennas are used in the exemplary embodiment. Each antenna is pointed at the location on the road where the vehicle detection occurs. Since both of the antennas form a straight line that can contain the transponder, the intersection of the two lines defines the location of the transponder. When the transponder reaches this location, the system declares that the vehicle detected contains a transponder; based on the communications with this transponder, its ID is known. If no transponder communication meets this criteria, then the vehicle detected does not contain a transponder and the vehicle is processed as a "non-transponder" equipped vehicle.

In an exemplary implementation, a one-half wavelength antenna array is used to receive the transmitted signals and measure the phase front of the signals. The sum channel is used to establish that a transmission has occurred in the area of the locator system and the difference channel is used to isolate any transponder that is at the specific area of interest on the road. This approach to locating transponders on the road employs, in an exemplary embodiment, phase interferometry. The phase fronts from each antenna pair are converted to electrical phase angles from which the spatial angles off boresight are derived. This scheme can be implemented by sampling the transponder's received signal, converting the frequency of the incoming signal to an intermediate frequency (IF), e.g., 12.5 MHz, and sampling this IF with an analog-to-digital converter (ADC), e.g., an 8-bit ADC. The resulting data stream is processed by a Fast Fourier Transformer (FFT), filtered, and averaged to obtain the amplitude and phase of each antenna. Instead of adding and subtracting the two phases for each antenna, the electrical phase difference is used to obtain a spatial angle as a measure of the transponder's displacement off antenna boresight. Using two boresight readings, one from each antenna pair, the transponder is located on the road by means of triangulation.

Figure 4:
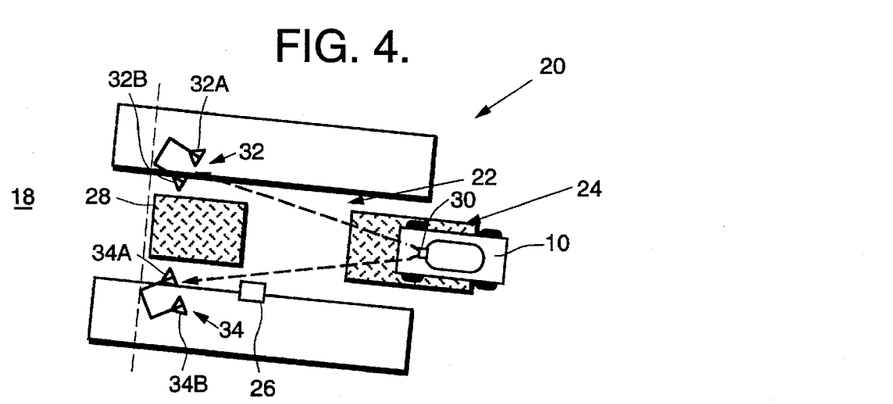
FIG. 4 is a simplified diagrammatic depiction of a barrier-based toll collection system employing this invention.

FIG. 4 shows a barrier-based toll collection system 20 in accordance with the invention. As vehicles 10 approach the system, they are routed through a toll collection barrier area 22 that separates the vehicles. At the entrance to this area a vehicle detector 24 called an arming loop is used to detect vehicle presence. If the vehicle 100 has no transponder, than a manual toll process is activated. In this example, a ticket dispenser 26 issues to the driver of the vehicle a toll ticket when he enters a toll road. If the vehicle has a transponder 30, then the ticket dispenser 26 is suppressed and the vehicle is given an "electronic ticket" as it enters the toll road 18. As the vehicle leaves the barrier area 22 it passes over a second vehicle detector 28 known as a clearing loop. The clearing loop 28 "clears" the system 20 and allows the arming loop 24 to process the next vehicle. This process is repeated as each vehicle enters the system.

In the exemplary system of FIG. 4, two antenna arrays 32 and 34 have their boresights on the arming loop 24. Each array comprises two antenna elements. The antenna typically uses elements that are mounted on a common structure. The elements provide an antenna pattern that covers the area of interest on the road. The antenna elements could use a dipole or any other type of antenna design. The antenna element spacing is the physical distance between the electrical centroid of each antenna element. The frequency of operation defines this distance. A one-half wavelength spacing would set this distance equal to one-half wavelength of (2C/f), where f is the frequency and C is the speed of light. Thus, array 32 includes antenna elements 32A and 32B, and array 34 includes elements 34A and 34B. When a vehicle is detected, the antenna arrays 32 and 34 tell the system 20 whether the vehicle that caused the detection is equipped with a transponder 30. If a vehicle has no transponder, then the ticket dispenser 26 is activated and a ticket issued to the vehicle. If the vehicle has a transponder which is detected by the system, the ticket dispenser 26 is suppressed and an "electronic ticket" is issued.

Figure 5:
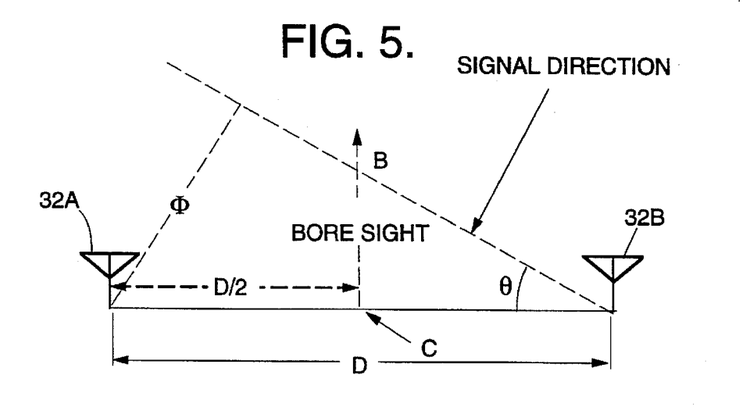
FIG. 5 illustrates characteristics of an exemplary array of the system of FIG. 3.

FIG. 5 shows in further details pertinent characteristics of exemplary antenna array 32. The array includes antenna elements 32A and 32B, separated by a distance D. The centroid of the antenna array is indicated as centroid C. The vehicle transponder signal is incident on the array along direction S. Two antenna arrays 32 and 34 are employed in this exemplary embodiment since the boresight for one array is represented by a plane that is perpendicular to the centroid of the antenna array, and the intersection of this plane and the road forms a line of possible locations. The intersection of the two lines formed by the two antenna arrays 32 and 34 is used to fully define the presence of the transponder in the detection zone.

Figure 6:
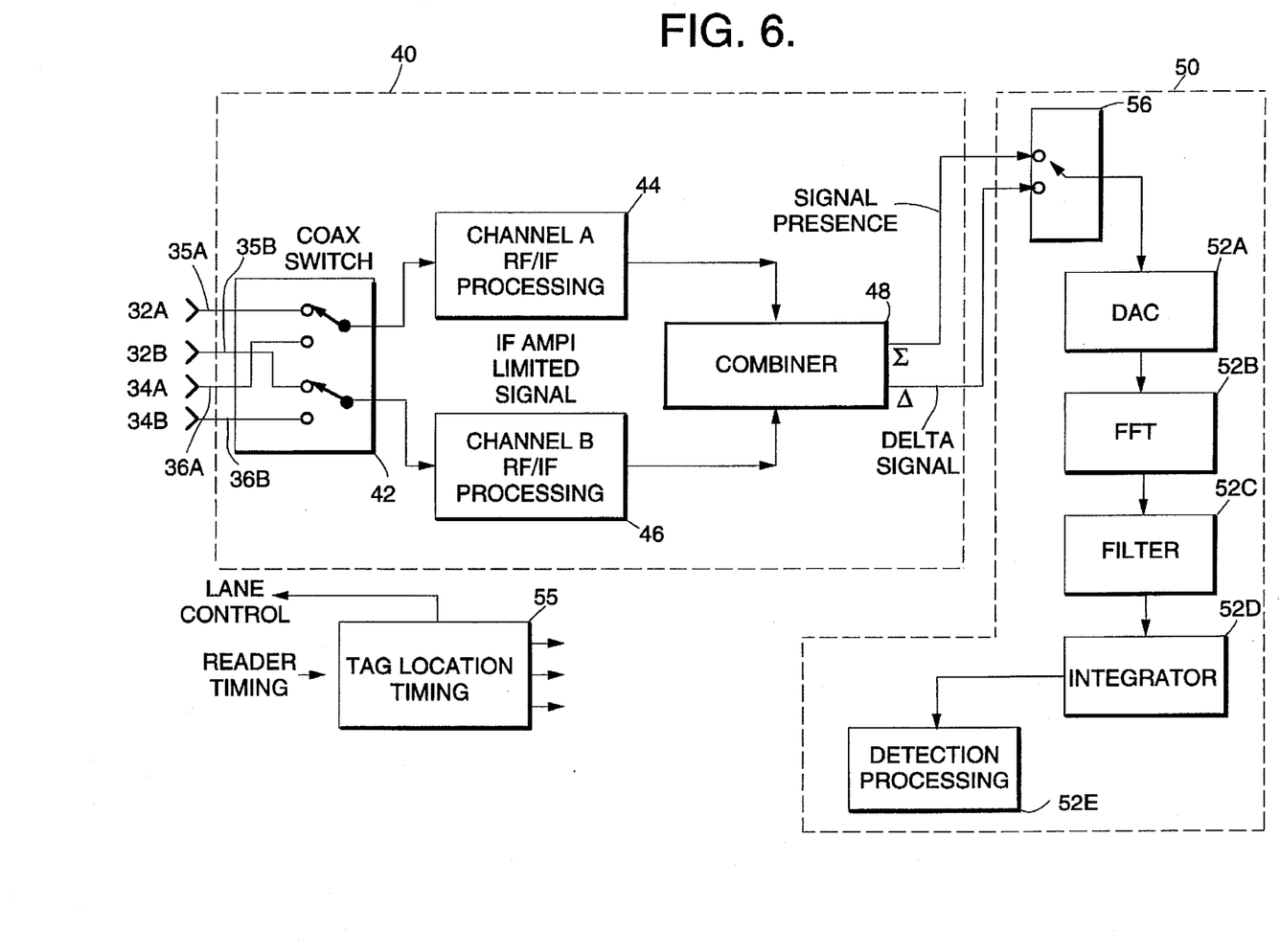
FIG. 6 is a simplified block diagram illustrating processing hardware employed in a toll collection system employing transponder detection in accordance with the invention.

FIG. 6 shows the receiver and processor arrangement comprising the system 20. The outputs of the two antenna arrays 32 and 34, each a one-half wavelength array, are connected by cables 35A, 35B, 36A and 36B to the system receiver 40; the receiver output is passed to the processor 50. The receiver 40 includes an RF coaxial switch 42 to switch the receiver input between the two antenna arrays 32 and 34. Thus, the outputs of antennas 32 and 34 are switched at the receiver input to alternately feed the two channels 44 and 6 comprising the receiver 40.

The measurement starts with the receiver 40 connected to the antenna array 32. The output of the two array elements 32A and 32B are fed to the two channels 44 and 46 to be processed from RF to an IF, amplitude limited, and then combined into a sum and difference measurement at combiner 48. The combiner 48 develops a sum channel signal representing the sum of the signal contributions from the two antenna elements, and a difference channel signal representing the difference of the signal contributions from the two antenna elements.

The sum and difference channel signals are fed to the system processor 50. In this exemplary embodiment, a switch 56 selects either the sum or difference signal for processing, permitting the sum and difference signals to be processed serially to lower the cost of the system. The IF sum and difference channel signals are sampled with a analog-to-digital converter (ADC) 52A, e.g., an 8-bit ADC. The resulting data stream is processed by a Fast Fourier Transformer (FFT) 52B, filtered by filter 52C, and averaged at integrator 52D to obtain the amplitude and phase of the selected sum or difference signal. The switch 56 is then operated to select the other signal, and the process is repeated.

The sum channel signal is used to define the presence of a transponder signal, and the difference channel signal is used to determine whether the transponder signal was transmitted from the detection zone. This process is accomplished by detecting the amplitude of the sum signal. The transponder signal arrives at the antenna elements at an amplitude V that is defined by the path loss according to the relationship $$V^2 = V_T^2 * 10^{-\gamma/20}$$

where $V_T$ is the transponder transmit voltage, $\gamma$ is the path loss, $\gamma = -27.5 + 20 \log f + 20 \log D$, f in Mhz, D is the distance from the antenna to the transponder (meters).

The antenna element signals for a given antenna array are added together to form the sum channel signal 2 V for that array; the sum channel signal is compared to a threshold level. When 2 V exceeds the presence detection threshold, the transponder is present in an area near the zone. The difference channel signal for that array will approach zero level when the transponder is at the intersection defined by the centroid planes of the two antennas. The difference between these two levels, the sum and the difference, forms a ratio when the two levels are expressed in logarithmic form (dB), which is used to define the detection zone. For example, assume that the sum channel is 1.2 V and the difference channel is 0.9 V. The ratio is (1.2/0.9), and $-20*\log_{10}$ of this ratio is −2.5 dB. When the transponder is in the detection zone, the sum increases to 1.9 V and the difference channel is 0.1 V, with the negative logarithmic ratio equal to −25.6 dB. Both values exceed a presence detection threshold, and the latter value exceeds the detection zone threshold. In an exemplary embodiment, the presence detection threshold is −40 dBm, and the transponder detection signal threshold is a −20 dB logarithmic ratio. As is well known, −40 dBm can alternatively be expressed as $2.24 \times 10^{-3}$ V in a 50 ohm receiver.

FIGS. 2 and 3 are equally applicable to the system implementation of FIG. 6. FIG. 2 thus illustrates exemplary outputs of signal combiner 48 converted to spatial degrees for the two antenna arrays 32 and 34. Specifically, line 70 can be taken to represent the sum of the signal contributions from a given array, and line 72 can be taken to represent the difference between these signal contributions, all as a function of angular offset from the antenna array boresight. FIG. 3 can be taken to illustrate the ratio of the sum signal to the difference signal (dB) as a function of spatial angular offset from the antenna array boresight.

The following illustrates numerical examples of the system with a −40 dBm presence threshold and a 20 dB detection zone threshold. Example calculations are made with (1) a transponder whose signal exceeds both thresholds, (2) a transponder signal that fails both threshold criteria, and (3) a transponder signal that passes one threshold and fails the second threshold criteria. The third case (passes/fails) illustrates how the system will handle stronger transponder signal levels.

Assume that the path length from the transponder to the antenna array is 5 meters, thus giving a path loss of 45.7 dB, and that the transponder signal strength is 1 mW (0 dBM) (equivalent to 0.614 V in free space (377 ohms), or 2.24 V at 50 ohms). In this case, the signal strength at the array is −45.7 dBm, $26.9 \times 10^6$ mW ($3.2 \times 10^{-3}$ V in free space, or $1.16 \times 10^{-3}$ V at 50 ohms). Adding together the signals received at the two elements of the array to form the sum signal, assuming 0 dB antenna gain, results in a sum signal value of $6.4 \times 10^{-3}$ V in free space. Converting this value to dBm, $10*\log_{10}[(6.4 \times 10^{-3})^2/-(377)]$ yields −39.6 dBm. Summarizing these assumptions:

1. Transponder sends signal at 0 dBm (0.614 V free space, or 2.24 V at 50 ohms);
2. Path loss at 5 meters is 45.7 dB;
3. Signal at array=−45.7 dBm ($3.2 \times 10^{-3}$ V free space; $2.2 \times 10^{-3}$ V at 50 ohms);
4. Array adds the signals for two elements ($6.4 \times 10^{-3}$ V in free space; $2.2 \times 10^{-3}$ V at 50 ohms);
5. Signal calculated back to dBm=−39.6 dBm (−40 dBm threshold).

The following example illustrates the detection of a transponder in the vehicle detection zone, under the foregoing assumptions.

1. Assume the transponder is 5° off boresight from the antenna arrays. The electrical phase shift is $\phi=180 \sin \Theta=15.7°$.
2. The sum signal will be V+V cos(15.7°)=1.96(V), with $V=3.2\times10^{-3}$. This is $6.27\times10^{-3}$ volts or −39.8 dBm, and exceeds the detection threshold (−40 dBm).
3. The difference signal will be $0.037(V)=118\times10^{-6}$ volts.
4. The ratio of the sum to the difference signals is (1.96(V)/0.03(V))=169.5. Hence, (−20 log($\Sigma/\Delta$))=−34.5 dB and exceeds the threshold (20 dB);
5. Because of the results of steps 2 and 4 above, the vehicle has a transponder.

The following example assumes the signal levels given above, and illustrates the case in which a transponder is not detected within the vehicle detection zone.

1. Assume a transponder that is 25° off boresight from the antenna array, the electrical phase shift is $\phi=180 \sin \Theta=76.1°$.
2. The sum signal will be V+Vcos (76.1)=1.24 V. With $V=3.2\times10^{-3}$ the sum signal value=$3.97\times10^{31\ 3}$ or −43.8 dBm and does not exceed the threshold (−40 dBm).

2a. Now assume that the distance D from the transponder to the antenna array=2.5 meter, instead of 5 meters. This provides a signal level increase of 6 dB, and the sum signal value is −37.8 dBm, which exceeds the threshold (−40 dBm).

3. The difference signal will be V−(V)cos(76.1)=0.76(V).
4. The ratio (in dB) of the sum signal to the difference signal is (−20)log (1.24 V/0.76 V)=4.3 dB. Since V cancels from the equation, this result applies to both cases 2 and 2A above.
5. In case 2, the signal does not exceed the presence threshold nor the detection zone threshold. In cash 2A, the signal exceeds the presence threshold but not the detection zone threshold.
6. Under each case 2 and 2A, the vehicle has no transponder.

With an exemplary implementation of a transponder, described more fully in commonly assigned U.S. Pat. No. 5,307,349, the transponder transmission lasts for 1120 microseconds and consists of 560 bits. The invention is intended to operate with a communication system that activates transponder transmissions. The barrier unit sends out a beacon signal that activates, at a specific time, a transponder response. The response signal is processed by the invention and a location determination is made.

The measurement of the signal from each antenna element is made in 50 microseconds intervals that includes a 10 microsecond switching and settling time. This corresponds to 20 bits of energy collected on each measurement. The transponder 30 in a given vehicle transmits a signal encoded with a digital code uniquely specifying the particular vehicle. The receiver 40 initially is switched to receive signals from one antenna array 32, during an initial 50 microsecond interval. The receiver 40 then switches to the other antenna array 34 for 50 microseconds. The processor 50 then processes the information to determine whether a transponder-equipped vehicle is present, and if so, its digital code. A function of the processor 50 is to decode the code for the vehicle to be able to issue an "electronic ticket." The receiver 40 can then switch to another lane for two 50 microsecond measurements of the antenna arrays at the other lane, and so on. In this way this exemplary system is capable of processing eleven lanes of a barrier-based system. In this exemplary system, a 160 microsecond buffer time is used at the start and end of the processing and this then limits the operation to 8 lanes with one receiver and processor.

Figure 7:
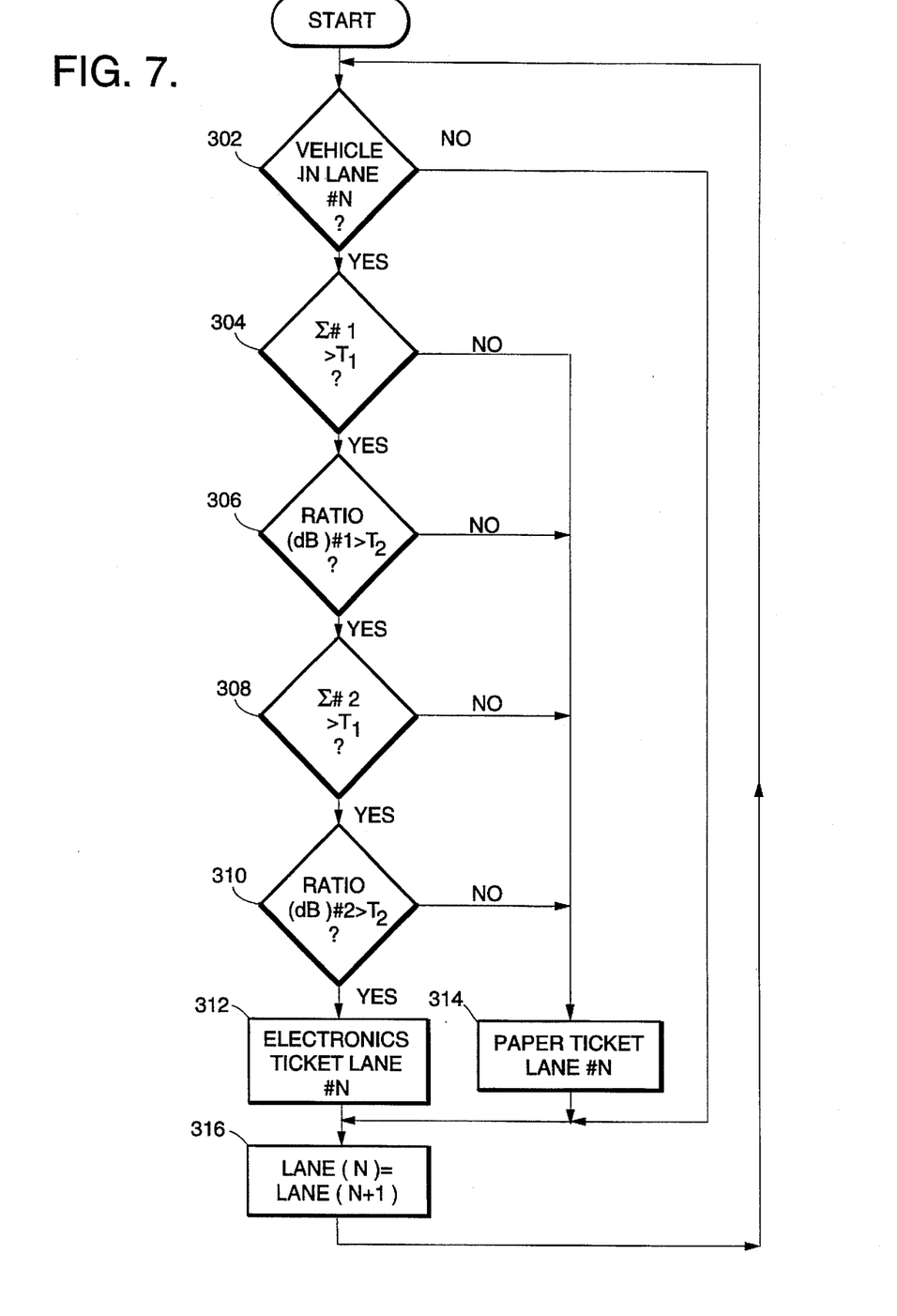
FIG. 7 is a flow diagram illustrating exemplary detection processing for the system of FIG. 4.

FIG. 7 is a simplified flow diagram illustrating the serial processing of the sum and ratio signal processing for a system having N lanes and embodying this invention. Starting with the first lane (N=1), the arming loop for this lane is checked (step 302) to determine whether a vehicle is in lane 1. If no vehicle is present, the processing branches to step 316, where the value for N is incremented, and the processing returns to step 302 to commence the processing cycle again for the second lane. Assuming, for the case of N=1, the arming loop indicates that a vehicle is present in lane 1, the tag location timing and switch control 55 selects lane 1 in the barrier and the coaxial switch 42 selects the elements 32A and 32B of the first antenna in that lane. The selector switch 56 selects the sum output of the receiver and processes this signal, comparing its magnitude with a threshold T1 (step 304). If the sum signal for the first antenna does not exceed the threshold T1, indicating that the vehicle is not transponder equipped, operation branches to step 314 to cause a paper ticket to be issued to the vehicle in lane 1. If the sum signal at step 304 exceeds threshold T1, then at step 306, the logarithmic ratio (in dB) of the sum signal to the difference signal is calculated, and compared to threshold T2. If the ratio for the first antenna exceed the dB threshold, operation branches to step 314 to issue a paper ticket. If the ratio signal value for the first antenna 32 exceeds the threshold T2, then at step 308, the switch 42 selects the second antenna for lane 1, antenna 34, and the threshold comparison for the sum and ratio signal values is repeated at steps 308 and 310. If the thresholds are exceeded in each of steps 304–310, a vehicle transponder is declared present at lane 1, and an electronic ticket is issued (step 312) to the vehicle identification given by the transponder interrogation response signal. If the threshold is not exceeded in any of steps 304–310, the system determines that the vehicle in lane 1 is not transponder-equipped, and issues a paper ticket for the vehicle in lane 1 (step 314). At step 316, the lane number (N) is incremented, the tag location timing and switch control 55 selects the antennas for the next lane 2, and the processing cycle repeats. This continues until all N lanes have been processed, whereupon the lane pointer N is reset to lane 1, and the complete cycle repeats.

While the system has been described for an exemplary application in which a paper ticket is issued for vehicles which are not transponder-equipped, alternatively the paper ticket dispenser could be a coin basket, an operator collecting coins or issuing tickets, or any other type of toll barrier system. Also, the system can be used with a camera to provide images of the vehicle for enforcement procedures if used with an electronic ticket only lane.

Figures 8, 11:
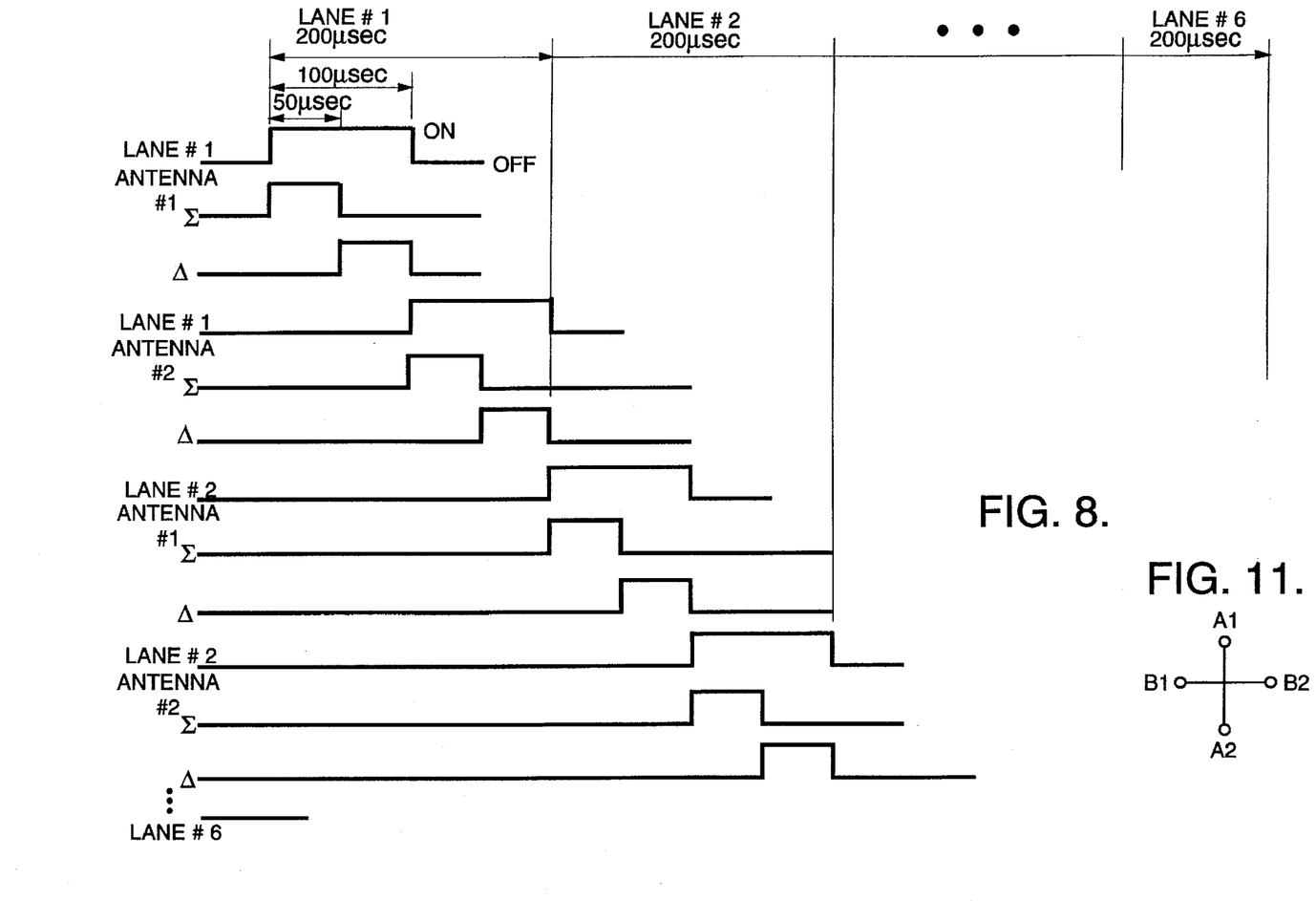
FIG. 8 is a timing diagram illustrating the sequence in which the processing for a multi-lane system can be performed in accordance with the invention.
FIG. 11 illustrates a simplified diagram of a four-element antenna which may be used in an alternate embodiment of the invention.

FIG. 8 is a timing diagram illustrating how this exemplary system can support the measurement of multiple lanes in a single transmission from a vehicle transponder. If more lane coverage is required, a second transmission is activated from the transponder and additional lanes are processed using this second transmission. The measurements are performed rapidly to support the serial processing, thus allowing one system to handle multiple lanes. The time duration of one antenna measurement in this exemplary embodiment is 50 microseconds, and a full transmission, covering eight barrier lanes, is 800 microseconds, plus 160 microsecond buffers at the beginning and end of the transmission. Since here are two antennas per lane, each lane is allocated 100 microseconds.

Figure 9:
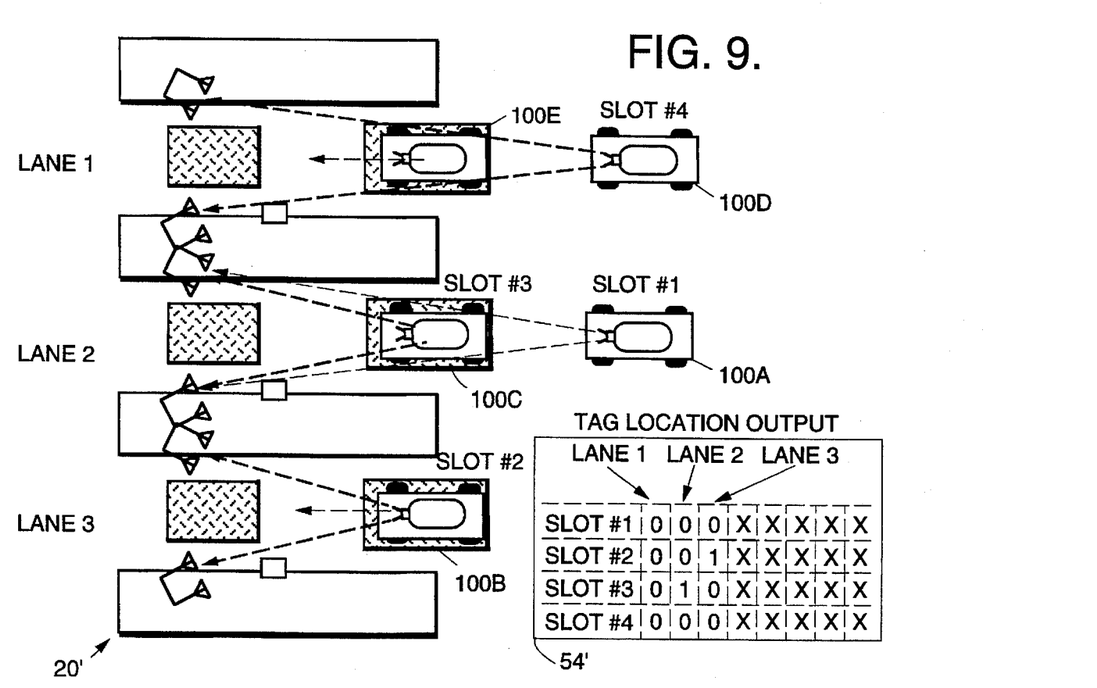
FIGS. 9 and 10 illustrate particular exemplary operational scenarios for the system.

FIG. 9 shows the system extended to a three lane system 20'. Five vehicles 100A–100E are shown approaching a toll barrier system. In the communication frame 54', the electronic toll collection system communicates with four vehicles 100A–100D in time slots #1, #2, #3, and #4. The vehicle detection system 20' has also identified one vehicle in each lane of the barrier. When the transmission with the four transponders occurred, the transponder detection process, as described earlier, is used to determine if the transmission came from the detection areas. The frame 54' illustrates the results of the transponder detector processing. The system 20' determines if the vehicle detection that occurred in lane 1 was the result of a transponder equipped vehicle. The first value in each of the slot transmissions represent lane #1. Since no transponder signal came from the lane #1 detector area, all the values are "O's" and the system then processes the vehicle 100E as a non-transponder equipped vehicle and a toll ticket is issued. In lane #2 the system identifies that the detected vehicle 100C did have a transponder and that the system communicated with that vehicle in slot #3. The identification of the transponder and the vehicle is thus contained in the information received by slot #3 data and the system processes lane #2 as a transponder equipped vehicle and issues an "electronic" toll ticket. In lane #3 the vehicle 100B detected had a transponder that was communicated with in slot #2. The communications that occurred in slots #1 and #4 were with vehicles 100A and 100D that were not in the detection zones and therefore are still in the queue and will be processed later.

Figure 10:
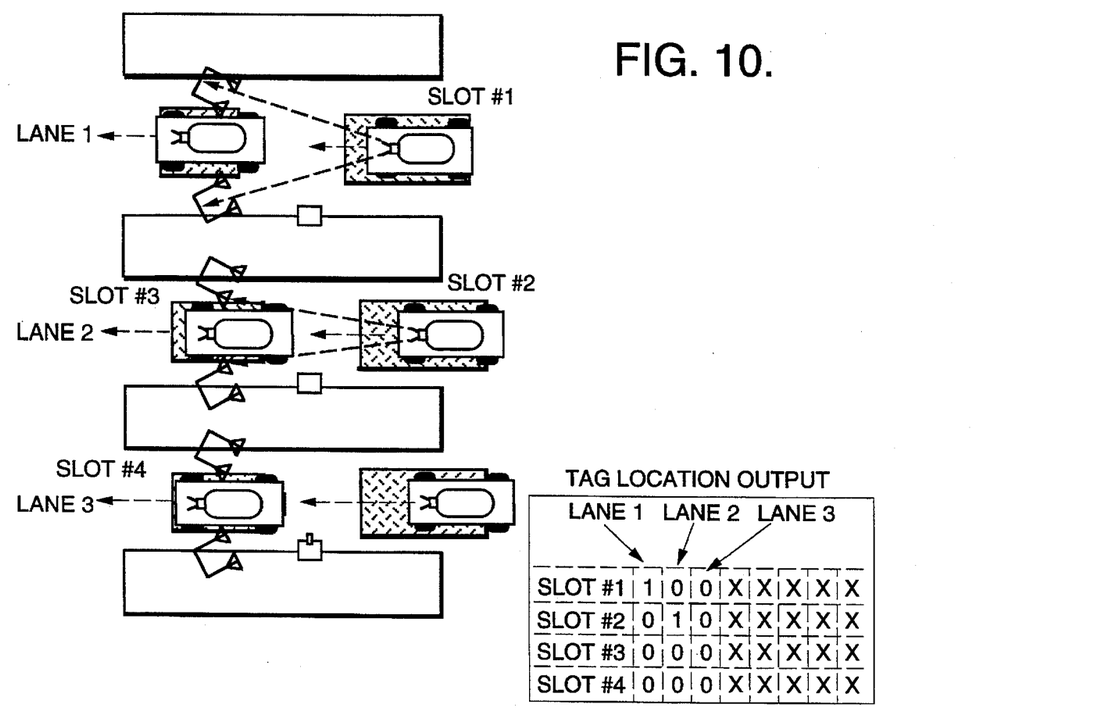

FIG. 10 illustrates the system 20' with the process later in time as the vehicles move further through the barrier and three more vehicle detections have occurred. The transmission with vehicles has been repeated but the communications Fare determined that lanes #1 and #2 are processed as transponder equipped vehicles and that lane #3 is a non-transponder equipped vehicle. Communication frame 54" shows the data used for these decisions. Note that the measurements beyond lane #3 contain no data. This is because only three lanes exist. If the barrier was extended to more lanes, then this part of the data would be used for operations in those lanes. In the system of U.S. Pat. No. 5,307,349 the assignment of time slots is dynamic and can change from communication to communication.

The invention does not rely on the communication zone defined by the antenna pattern to establish the location of the transponder. The antenna pattern can define a communication zone, i.e., an area of the road during which communication with the transponder can occur, that is arbitrarily large. This ability to use a large communication zone increases the performance of the electronic toll collection processing. The phase measurement only requires that the communication process provide enough energy so that a reliable measurement can be performed. In one exemplary embodiment, the required Eb/No needed for communications is 13 to 15 dB. The location process combines 20 bits of data and therefore has the equivalent of a 26 to 28 dB S/N for the phase measurement. This provides more than enough signal for the measurement process.

Instead of using two, two-element antenna arrays which are spatially separated, e.g., with one array on each side of the barrier lane, one four-element antenna can alternatively be employed. In this instance, the antenna includes two two-element arrays which are oriented perpendicular to each other, as indicated in FIG. 11, where elements A1 and A2 form a first array, and elements B1 and B2 form a second array which is perpendicular to the first array. The antenna of FIG. 11 can be placed over the lane to be measured, with its boresight pointed at the lane. Since each array boresight defines a plane, and the respective boresight planes are perpendicular to each other, the intersections of the plane from each array meet to form a line in space. This line is perpendicular to the plane of the four elements and represents the boresight of the four elements. The element plane is then placed over the lane and parallel to the lane surface. The boresight of the array intersects the surface of the lane and forms a point. Since the detection process uses thresholds, this point expands to a circle of the surface of the lane with the point as its center. This circle is directed at the vehicle detection area of the lane. If the plane of the antenna is not parallel to the surface of lane, but at an angle, then the circle changes to an ellipse on the surface to the lane. This antenna tilt, combined with threshold adjustments, is used to extend the area on the lane to completely cover the vehicle detection area.

In another alternative embodiment, a single, two-element antenna is employed for each lane. The sum and difference processing occurs for this antenna, but detection of the vehicle transponder occurs through processing of one array. This array defines a boresight plane which intersects the decision area. This type of antenna can be useful to eliminate "cross lane" or "bumper to bumper" read errors, but not both types of errors, as in the case of the embodiment of FIG. 4. This simplified system can be useful, e.g., for one lane roads.

It is understood that the above-described embodiments are merely illustrative of the possible specific embodiments which may represent principles of the present invention. Other arrangements may readily be devised in accordance with these principles by those skilled in the art without departing from the scope and spirit of the invention.

What is claimed is:

1. A transponder detection system for detecting the presence of a transponder-equipped vehicle at a detection zone, a transponder transmitting RF signals, comprising:

an antenna array comprising a plurality of antenna elements defining an array boresight, said boresight intersecting said detection zone;

receiver means coupled to said antenna array and responsive to transponder transmissions for providing an array sum signal that represents a sum of signal contributions from each antenna element of said antenna array, and an array difference signal that represents a difference of signal contributions from said each antenna element of said antenna array; and processing means responsive to said array sum and difference signals to determine whether the transponder is located within the detection zone, said processing means comprising means responsive to said array sum signal to determine whether a valid transponder signal has been received by the system, the means responsive to said difference signal to determine whether said transponder is located within the detection zone.

2. The system of claim 1 wherein said antenna array comprises first and second antenna elements spaced from each other by one half wavelength at a nominal transponder transmission length.

3. The system of claim 1 wherein said processing means comprises first comparing means for determining whether said sum signal exceeds a first threshold, and second comparing means for testing said difference signal against a second threshold.

4. The system of claim 1 wherein said processing means comprises means for determining a ratio value of said sum and said difference signals, first comparing means for determining whether said sum signal exceeds a first threshold, and second comparing means for testing said ratio value against a second threshold.

5. A transponder detection system for detecting the presence of a transponder-equipped vehicle at a detection zone, a transponder transmitting RF signals, comprising:

first and second antenna arrays, each array comprising a plurality of antenna elements defining an array boresight, said antenna arrays disposed at spaced locations relative to the detection zone, each array boresight directed at said detection zone;

receiver means responsive to transponder transmissions for providing an array sum signal that represents a sum of signal contributions from each antenna element of said antenna arrays, and an array difference signal that represents a difference of signal contributions from each antenna element of said antenna arrays; and processing means responsive to said respective array sum and difference signals to determine whether the transponder is located within the detection zone, said processing means comprising means responsive to said sum signal to determine whether a valid transponder signal has been received by the system, and means responsive to said difference signal to determine whether said transponder is located within the detection zone.

6. The system of claim 5 wherein said each array comprises first and second antenna elements spaced from each other by one half wavelength at a nominal transponder transmission wavelength.

7. The system of claim 5 wherein said processing means comprises means for converting each said array difference signal into data indicating a transponder angular location relative to the boresight of the arrays, and triangulation processing means to locate the position of the transponder-equipped vehicle by triangulation of the respective angular locations and known orientations of the arrays relative to the detection zone.

8. The system of claim 5 wherein said processing means comprises first comparing means for determining whether said sum signal for said each array exceeds a first threshold, and second comparing means for testing said difference signal for said each array against a second threshold.

9. The system of claim 5 wherein said processing means comprises means for determining a ratio value of said sum and difference signals for each of said first and second arrays, first comparing means for determining whether said sum signal of said each array exceeds a first threshold, and second comparing means for testing said ratio value for each of said first and second arrays against a second threshold.

10. The system of claim 9 wherein said processing means comprises means for determining that a vehicle detected at said detection zone is not equipped with a transponder unless said first and second comparing means indicate for said each array that the valid transponder signal has been received from said detection zone.

11. The system of claim 5 wherein said first array is disposed along a first side of a road lane, and said second array is disposed along a second side of said road lane.

12. The system of claim 5 wherein said first and second arrays are centered about a common antenna axis, and wherein said first array is perpendicular to said second array.

13. The system of claim 5 further comprising means for sensing the presence of a vehicle at said detection zone.

14. A barrier-based toll collection system for determining vehicle tolls for access to a toll roadway, comprising:

a toll collection barrier area defining a vehicle detection zone;

a vehicle detector for detecting the presence of a vehicle at said detection zone;

a toll collection apparatus for collecting tolls assessed to vehicles entering said detection zone which are not equipped with a transponder;

a transponder detection system responsive to said vehicle detector for detecting the presence of a transponder-equipped vehicle at said detection zone, the transponder transmitting RF signals, comprising:

first and second antenna arrays, each array comprising a plurality of antenna elements defining an array boresight, said antenna arrays disposed at spaced locations relative to the detection zone, each array boresight directed at said detection zone;

receiver means responsive to transponder transmissions received from said vehicle for providing an array sum signal that represents a sum of a signal contributions from each antenna element of said antenna arrays, and an array difference signal that represents a difference of signal contributions from each antenna element of said antenna arrays; and processing means responsive to said respective array sum and difference signals to determine whether the transponder-equipped vehicle is located within the detection zone, said processing means comprising means responsive to said sum signal to determine whether a valid transponder signal has been received by the system, and means responsive to said difference signal to determine whether said transponder-equipped vehicle is located within the detection zone; means responsive to said detection system processor determination that said detected vehicle at said detection zone is transponder-equipped for suppressing said toll collection apparatus and for electronically issuing a toll charge to said transponder-equipped vehicle.

15. The system of claim 14 wherein said each array of said detection system comprises first and second antenna element spaced from each other by one half wavelength at a nominal transponder transmission wavelength.

16. The system of claim 14 wherein said processing means comprises means for converting each said array difference signal into data indicating a transponder angular location relative to the boresight of the arrays, and triangulation processing means to locate the position of the transponder-equipped vehicle by triangulation of the respective angular locations and known orientations of the arrays relative to the detection zone.

17. The system of claim 14 wherein said processing means comprises first comparing means for determining whether said sum signal for said each array exceeds a first threshold, and second comparing means for testing said difference signal for said each array against a second threshold.

18. The system of claim 14 wherein said processing means comprises means for determining a ratio value of said sum and said difference signals for each of said first and second arrays, first comparing means for determining whether said sum signal of said each array exceeds a first threshold, and second comparing means for testing said ratio value for each of said first and second arrays against a second threshold.

19. The system of claim 18 wherein said processing means comprises means for determining that the vehicle detected at said detection zone is not equipped with the transponder unless said first and second comparing means indicate for said each array that the valid transponder signal has been received from said detection zone.

20. The system of claim 14 wherein said first array is disposed along a first side of a road lane, and said second array is disposed along a second side of said road lane.

21. The system of claim 14 wherein said first and second arrays are centered about a common antenna axis, and wherein said first array is perpendicular to said second array.

* * * * *